United States Patent
Walkin

(10) Patent No.: US 9,860,186 B1
(45) Date of Patent: *Jan. 2, 2018

(54) MULTIPLE-SPEED MESSAGE CHANNEL OF MESSAGING SYSTEM

(71) Applicant: Machine Zone, Inc., Palo Alto, CA (US)

(72) Inventor: Lev Walkin, Santa Clara, CA (US)

(73) Assignee: Machine Zone, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,525

(22) Filed: Feb. 15, 2017

Related U.S. Application Data

(63) Continuation of application No. 15/202,908, filed on Jul. 6, 2016, now Pat. No. 9,608,928.

(51) Int. Cl.
| | |
|---|---|
| *H04L 12/875* | (2013.01) |
| *H04L 12/863* | (2013.01) |
| *H04L 12/26* | (2006.01) |
| *H04L 12/927* | (2013.01) |

(52) U.S. Cl.
CPC ........ *H04L 47/622* (2013.01); *H04L 43/0864* (2013.01); *H04L 47/805* (2013.01)

(58) Field of Classification Search
CPC .. H04L 47/564; H04L 43/0864; H04L 47/622
See application file for complete search history.

(56) References Cited

U.S. PATENT DOCUMENTS

| | | |
|---|---|---|
| 4,264,924 A | 4/1981 | Freeman |
| 5,404,488 A | 4/1995 | Kerrigan et al. |
| 5,706,331 A | 1/1998 | Wang et al. |
| 5,878,228 A | 3/1999 | Miller et al. |
| 6,208,691 B1 | 3/2001 | Balakrishnan et al. |
| 6,522,885 B1 | 2/2003 | Tang et al. |
| 6,549,959 B1 | 4/2003 | Yates et al. |
| 7,047,394 B1 | 5/2006 | Van Dyke et al. |

(Continued)

OTHER PUBLICATIONS

"Cloud Pub/Sub," accessed on the internet at: https://cloud.google.com/pubsub/overview; ; downloaded Aug. 7, 2015; 5pgs.

(Continued)

*Primary Examiner* — Jerry Dennison
(74) *Attorney, Agent, or Firm* — Womble Bond Dickinson (US) LLP

(57) ABSTRACT

Methods, systems, and apparatus, including computer programs encoded on a computer storage medium, for receiving from a plurality of publishers messages of a first channel of a plurality of distinct channels wherein each channel comprises an ordered plurality of messages, storing messages of the first channel in one or more first buffers according to the order, each first buffer having a respective time-to-live, for one or more connections, determining a respective sampling rate based on a data type of the first channel and a determined latency of the connection, receiving from a subscriber through a first connection a request for messages of the first channel, selecting messages in the first buffers according to the order and the sampling rate, and sending the selected messages using the first connection to the subscriber according to the order.

20 Claims, 9 Drawing Sheets

(56) References Cited

U.S. PATENT DOCUMENTS

| | | | |
|---|---|---|---|
| 7,065,633 B1 | 6/2006 | Yates, Jr. et al. | |
| 7,376,092 B2 | 5/2008 | Yajnik et al. | |
| 7,613,813 B2 | 11/2009 | Hussain et al. | |
| 7,668,908 B2 | 2/2010 | Kakivaya et al. | |
| 7,676,580 B2* | 3/2010 | Hill | G06F 9/546 709/206 |
| 7,774,720 B1 | 8/2010 | Demetriades et al. | |
| 7,917,124 B2 | 3/2011 | D'Angelo et al. | |
| 7,929,562 B2 | 4/2011 | Petrovykh | |
| 7,930,349 B2 | 4/2011 | Hussain et al. | |
| 7,934,070 B2 | 4/2011 | Brittain et al. | |
| 7,941,448 B2* | 5/2011 | Eslambolchi | H04L 63/0281 707/792 |
| 7,970,828 B2 | 6/2011 | Carmeli et al. | |
| 7,970,918 B2* | 6/2011 | Thompson | H04L 12/5695 709/230 |
| 8,042,140 B2 | 10/2011 | Thomas et al. | |
| 8,051,140 B2 | 11/2011 | Lum et al. | |
| 8,065,384 B2 | 11/2011 | Plewnia et al. | |
| 8,065,504 B2 | 11/2011 | Yates, Jr. et al. | |
| 8,068,901 B2 | 11/2011 | Ghanem et al. | |
| 8,074,055 B1 | 12/2011 | Yates, Jr. et al. | |
| 8,086,672 B2 | 12/2011 | Horvitz | |
| 8,121,828 B2 | 2/2012 | Yates, Jr. et al. | |
| 8,375,095 B2* | 2/2013 | Yurkovich | G06F 9/546 709/206 |
| 8,392,555 B2 | 3/2013 | Gale et al. | |
| 8,429,702 B2 | 4/2013 | Yasrebi et al. | |
| 8,441,965 B2 | 5/2013 | Jazra | |
| 8,489,674 B2* | 7/2013 | Srivastava | G06Q 10/00 709/203 |
| 8,539,359 B2 | 9/2013 | Rapaport et al. | |
| 8,572,296 B2 | 10/2013 | Shasha et al. | |
| 8,605,781 B2 | 12/2013 | Rabenold et al. | |
| 8,774,203 B2 | 7/2014 | Scott et al. | |
| 8,799,213 B2 | 8/2014 | Wong et al. | |
| 8,850,015 B2 | 9/2014 | Finn | |
| 8,850,263 B1* | 9/2014 | Yourtee | G06F 11/0709 714/20 |
| 8,850,490 B1 | 9/2014 | Thomas et al. | |
| 8,856,202 B2 | 10/2014 | McCabe et al. | |
| 8,886,731 B2 | 11/2014 | Gunawardena et al. | |
| 8,898,293 B2 | 11/2014 | Raleigh et al. | |
| 8,908,814 B2 | 12/2014 | Kumar et al. | |
| 8,937,962 B2 | 1/2015 | Tomonaga et al. | |
| 8,965,409 B2 | 2/2015 | Abhyanker | |
| 9,043,822 B1 | 5/2015 | Calzone et al. | |
| 9,215,261 B2 | 12/2015 | Marcus | |
| 9,270,944 B2 | 2/2016 | Brooks et al. | |
| 9,319,363 B1 | 4/2016 | Walkin et al. | |
| 9,319,365 B1 | 4/2016 | Milyakov | |
| 9,385,976 B1* | 7/2016 | Hafri | H04L 51/04 |
| 9,397,973 B1* | 7/2016 | Kushnir | H04L 51/14 |
| 9,407,585 B1* | 8/2016 | Walkin | H04L 51/04 |
| 9,407,593 B1 | 8/2016 | Milyakov | |
| 9,450,944 B1 | 9/2016 | Sousley et al. | |
| 9,509,684 B1 | 11/2016 | Dixson-Boles et al. | |
| 9,577,911 B1 | 2/2017 | Castleman | |
| 9,602,450 B1 | 3/2017 | Kushnir et al. | |
| 9,602,455 B2 | 3/2017 | Walkin et al. | |
| 9,608,928 B1 | 3/2017 | Walkin | |
| 9,608,953 B1 | 3/2017 | Kushnir et al. | |
| 9,667,681 B1 | 5/2017 | Milyakov | |
| 2002/0016851 A1* | 2/2002 | Border | H04B 7/18582 709/234 |
| 2002/0138659 A1 | 9/2002 | Trabaris et al. | |
| 2002/0194347 A1 | 12/2002 | Koo et al. | |
| 2003/0115317 A1* | 6/2003 | Hickson | H04L 29/06 709/224 |
| 2003/0135556 A1* | 7/2003 | Holdsworth | H04L 29/06 709/206 |
| 2003/0188196 A1 | 10/2003 | Choi | |
| 2004/0073641 A1 | 4/2004 | Minhazuddin et al. | |
| 2004/0083264 A1 | 4/2004 | Veselov | |
| 2004/0139166 A1 | 7/2004 | Collison | |
| 2004/0139309 A1 | 7/2004 | Gentil et al. | |
| 2004/0167932 A1 | 8/2004 | Edmonds | |
| 2005/0021622 A1* | 1/2005 | Cullen | G06Q 30/02 709/204 |
| 2005/0047396 A1 | 3/2005 | Helm et al. | |
| 2005/0171799 A1 | 8/2005 | Hull et al. | |
| 2005/0193041 A1 | 9/2005 | Bourbonnais et al. | |
| 2005/0262205 A1 | 11/2005 | Nikolov et al. | |
| 2005/0262215 A1 | 11/2005 | Kirov et al. | |
| 2005/0262411 A1 | 11/2005 | Vertes et al. | |
| 2006/0036679 A1 | 2/2006 | Goodman et al. | |
| 2006/0075119 A1 | 4/2006 | Hussain et al. | |
| 2006/0106840 A1 | 5/2006 | Rooney | |
| 2006/0149787 A1 | 7/2006 | Surlaker et al. | |
| 2006/0149840 A1* | 7/2006 | Thompson | H04L 12/5695 709/224 |
| 2006/0168070 A1 | 7/2006 | Thompson et al. | |
| 2007/0013948 A1* | 1/2007 | Bevan | G06F 3/1214 358/1.15 |
| 2007/0028173 A1 | 2/2007 | Lauder | |
| 2008/0016198 A1 | 1/2008 | Johnston-Watt et al. | |
| 2008/0186973 A1 | 8/2008 | Shihara et al. | |
| 2008/0235366 A1 | 9/2008 | Telfer et al. | |
| 2009/0037514 A1 | 2/2009 | Lankford et al. | |
| 2009/0157795 A1 | 6/2009 | Black | |
| 2009/0222348 A1 | 9/2009 | Ransom et al. | |
| 2009/0259756 A1 | 10/2009 | Karlsson et al. | |
| 2009/0287761 A1 | 11/2009 | Hawkins et al. | |
| 2010/0023626 A1 | 1/2010 | Hussain et al. | |
| 2010/0146170 A1 | 6/2010 | Brown et al. | |
| 2010/0166064 A1 | 7/2010 | Perlman et al. | |
| 2010/0251262 A1 | 9/2010 | Rokicki et al. | |
| 2011/0060812 A1 | 3/2011 | Middleton | |
| 2011/0176554 A1 | 7/2011 | Yamada et al. | |
| 2011/0179162 A1 | 7/2011 | Mayo et al. | |
| 2011/0225229 A1 | 9/2011 | Srivastava et al. | |
| 2011/0231523 A1 | 9/2011 | Haugland et al. | |
| 2011/0246503 A1 | 10/2011 | Bender et al. | |
| 2012/0023116 A1 | 1/2012 | Wilkes et al. | |
| 2012/0096546 A1 | 4/2012 | Dilley et al. | |
| 2012/0150960 A1 | 6/2012 | Nalawade | |
| 2012/0197990 A1 | 8/2012 | Li et al. | |
| 2012/0254175 A1 | 10/2012 | Horowitz et al. | |
| 2012/0278728 A1 | 11/2012 | Malin et al. | |
| 2012/0284756 A1 | 11/2012 | Kotecha et al. | |
| 2012/0296939 A1 | 11/2012 | Beaver et al. | |
| 2013/0024526 A1 | 1/2013 | Sacks et al. | |
| 2013/0031162 A1* | 1/2013 | Willis | H04L 67/02 709/203 |
| 2013/0066967 A1 | 3/2013 | Alexander | |
| 2013/0067114 A1 | 3/2013 | HJelm et al. | |
| 2013/0081060 A1* | 3/2013 | Otenko | G06F 9/52 719/314 |
| 2013/0103914 A1* | 4/2013 | Mitsunobu | H04L 43/024 711/154 |
| 2013/0132553 A1 | 5/2013 | Stratton et al. | |
| 2013/0159472 A1 | 6/2013 | Newton et al. | |
| 2013/0212491 A1 | 8/2013 | Yerli | |
| 2013/0254314 A1 | 9/2013 | Chow | |
| 2013/0290249 A1 | 10/2013 | Merriman et al. | |
| 2013/0290449 A1 | 10/2013 | Norby et al. | |
| 2013/0340097 A1 | 12/2013 | Gowel | |
| 2014/0079016 A1 | 3/2014 | Dai et al. | |
| 2014/0082085 A1 | 3/2014 | Krishnaprasad et al. | |
| 2014/0114738 A1 | 4/2014 | Tseng et al. | |
| 2014/0149452 A1 | 5/2014 | Nguyen et al. | |
| 2014/0156618 A1 | 6/2014 | Castellano | |
| 2014/0189772 A1 | 7/2014 | Yamagishi et al. | |
| 2014/0226713 A1 | 8/2014 | Perlman et al. | |
| 2014/0237057 A1 | 8/2014 | Khodorenko | |
| 2014/0279944 A1 | 9/2014 | Ghandeharizadeh et al. | |
| 2014/0286354 A1 | 9/2014 | Van De Poel et al. | |
| 2014/0310369 A1 | 10/2014 | Makhervaks et al. | |
| 2014/0372489 A1 | 12/2014 | Jaiswal et al. | |
| 2014/0372755 A1 | 12/2014 | Ristock et al. | |
| 2015/0012598 A1* | 1/2015 | Klimt | G06F 17/30424 709/206 |

(56) References Cited

U.S. PATENT DOCUMENTS

| | | | |
|---|---|---|---|
| 2015/0100664 A1* | 4/2015 | Flack | H04L 67/28 709/213 |
| 2015/0207851 A1 | 7/2015 | Nampally et al. | |
| 2015/0262151 A1 | 9/2015 | Enzminger et al. | |
| 2015/0317676 A1 | 11/2015 | Reid et al. | |
| 2015/0365358 A1 | 12/2015 | Strassner | |
| 2015/0379160 A1 | 12/2015 | Avraham et al. | |
| 2016/0041894 A1 | 2/2016 | Reid, III et al. | |
| 2016/0072865 A1 | 3/2016 | Kaplinger et al. | |
| 2016/0179855 A1 | 6/2016 | Roman et al. | |
| 2016/0219089 A1 | 7/2016 | Murthy et al. | |
| 2016/0261480 A1 | 9/2016 | Agarwal et al. | |
| 2016/0285986 A1 | 9/2016 | Mokhtari et al. | |
| 2016/0335293 A1 | 11/2016 | Teodorescu et al. | |
| 2017/0111336 A1 | 4/2017 | Davis et al. | |

OTHER PUBLICATIONS

"Publish-subscribe pattern"; accessed on the internet at: https://en.wikipedia.org/wiki/Publish%E2%80%93subscribe_pattern; downloaded Aug. 7, 2015; 4pgs.

"Welcome to PyPubSub's Home Page!," accessed on the internet at: http://pubsub.sourceforge.net/; downloaded Aug. 7, 2015; 2 pgs.

Bustamante, F., "The Active Streams Approach to Adaptive Distributed Applications and Services," Thesis, Georgia Institute of Technology; 112pgs.; Nov. 2001.

Cagle, K., "Convert a Text File to XML," accessed on the internet at http://www.devx.com/getHelpOn/10MinuteSolution/20356; downloaded Sep. 22, 2016; 8pgs.

Chakravarthy, S. and Vontella, N., "A Publish / Subscribe Based Architecture of an Alert Server to Support Prioritized and Persistent Alerts," Lecture Notes in Computer Science; 3347:1-6-116; Jan. 2004.

Cilia, M., et al., "Looking into the Past: Enhancing Mobile Publish/Subscribe Middleware," Proceedings of the 2nd Int'l Workshop on Distributed Event-based Systems (DEBS '03); pp. 1-8; Jun. 2003.

Corsaro, A., et al., "Quality of Service in Publish/Subscribe Middleware," IOS Press; pp. 1-19; 2003.

Int'l Search Report and Written Opinion of the ISA/EP in PCT/US2014/041531; dated Oct. 6, 2016; 12 pgs.

Int'l Search Report and Written Opinion of the ISA/EP in PCT/US2016/022316; dated Jun. 1, 2016; 11pgs.

Int'l Search Report and Written Opinion of the ISA/EP in PCT/US2016/023164; dated Jul. 11, 2016; 15pgs.

Int'l Search Report and Written Opinion of the ISA/EP in PCT/US2016/037358; dated Oct. 10, 2016; 13pgs.

Int'l Search Report and Written Opinion of the ISA/EP in PCT/US2016/039958; dated Oct. 4, 2016; 11pgs.

Int'l Search Report and Written Opinion of the ISA/EP in PCT/US2016/041530; dated Oct. 6, 2016; 12pgs.

Jafarpour et al., "Dynamic Load Balancing for Cluster-based Publish/Subscribe System," IEEE 2009; http://ieeexp lore.ieee.org/document/5230660/.

King, A., et al., "Load Balancing Content-Based Publish/Subscribe Systems," ACM Transactions on Computer Systems; 28(4):9:1-9:55; Dec. 2010.

Phanishayee, A., "Chaining for Flexible and High-Performance Key-Value Systems," Doctoral Dissertation, Carnegie Mellon University, School of Computer Science; 148pgs.; Sep. 2012.

Preshing, "Atomic vs. Non-Atomic Operations," accessed on the internet at http://preshing.com/20130618/atomic-vs-non-atomic-operations; downloaded Sep. 20, 2016; 10pgs.

Vahdat, A. and Becker, D., "Epidemic Routing for Partially-Connected Ad Hoc Networks," Duke University; 14pgs.; Jul. 2000.

Zeidler, et al., "Mobility Support with REBECA," Proc. 23rd Int'l Conference on Distributed Computing Systems Workshops; May 19-22, 2003; 7pgs.

U.S. Appl. No. 15/433,525, filed Aug. 7, 2015, Scalable, Real-Time Messaging System, Walkin, et al.

U.S. Appl. No. 15/223,392, filed Jul. 29, 2016, Scalable, Real-Time Messaging System, Walkin, et al.

U.S. Appl. No. 14/821,421, filed Aug. 7, 2015 Scalable, Real-Time Messaging System, Walkin, et al.

U.S. Appl. No. 14/821,428, filed Aug. 7, 2015, Scalable, Real-Time Messaging System, Walkin, et al.

U.S. Appl. No. 15/067,476, filed Mar. 11, 2016, Scalable, Real-Time Messaging System, Walkin, et al.

U.S. Appl. No. 15/436,217, filed Feb. 17, 2017, Scalable, Real-Time Messaging System, Walkin, et al.

U.S. Appl. No. 15/175,588, filed Jun. 7, 2016, Message Compression in Scalable Messaging System, Walkin.

U.S. Appl. No. 15/231,044, filed Aug. 8, 2016, Access Control for Message Channels in a Messaging System, Walkin, et al.

U.S. Appl. No. 15/244,380, filed Aug. 23, 2016, Scalable, Real-Time Messaging System, Walkin.

U.S. Appl. No. 15/274,281, filed Sep. 23, 2016, Systems and Methods for Providing Messages to Multiple Subscribers, Milyakov.

U.S. Appl. No. 15/202,908, filed Jul. 6, 2016, Multiple-Speed Message Channel of Messaging System, Walkin.

U.S. Appl. No. 15/159,447, filed May 19, 2016, Systems and Methods for Storing and Transferring Message Data, Milyakov.

U.S. Appl. No. 15/252,989, filed Aug. 31, 2016, Systems and Methods for Storing Message Data, Hafri, et al.

U.S. Appl. No. 14/879,661, filed Oct. 9, 2015, Systems and Methods for Storing Message Data, Hafri.

U.S. Appl. No. 15/290,695, filed Oct. 11, 2016, Systems and Methods for Storing Message Data, Hafri.

U.S. Appl. No. 14/879,689, filed Oct. 9, 2015, Systems and Methods for Storing and Transferring Message Data, Milyakov.

U.S. Appl. No. 15/063,390, filed Mar. 7, 2016, Systems and Methods for Storing and Transferring Message Data, Milyakov.

U.S. Appl. No. 15/291,633, filed Oct. 12, 2016, Systems and Methods for Storing and Transferring Message Data, Milyakov.

U.S. Appl. No. 14/885,034, filed Oct. 16, 2015, Systems and Methods for Transferring Message Data, Kushnir, et al.

U.S. Appl. No. 15/196,597, filed Jun. 29, 2016, Systems and Methods for Transferring Message Data, Kushnir, et al.

U.S. Appl. No. 15/435,915, filed Feb. 17, 2017, Systems and Message Methods for Transferring Data, Kushnir, et al.

U.S. Appl. No. 15/155,384, filed May 16, 2016, Maintaining Persistence of a Messaging System, Walkin.

U.S. Appl. No. 15/433,550, filed Feb. 15, 2017, Maintaining Persistence of a Messaging System, Walkin.

U.S. Appl. No. 15/442,036, filed Feb. 24, 2017, Selective Distribution of Messages in Scalable, Real-Time Messaging System, Sedan.

U.S. Appl. No. 15/442,286, filed Feb. 24, 2017, Data Storage Systems and Methods Using a Real-Time Messaging System, Milyakov et al.

U.S. Appl. No. 15/442,061, filed Feb. 24, 2017, Channel Management in Sealable Messaging System, Milyakov et al.

"BitTorrent," Wikipedia, retrieved from the Internet on Apr. 19, 2017, available at: URL:https://en.wikipedia.org/w/index.php?title= BitTorrent&oldid=719808892.

Int'l Search Report and Written Opinion of the ISA/EP in PCT/US2017/016901; dated Apr. 28, 2017; 13 pgs.

Int'l Search Report and Written Opinion of the ISA/EP in PCT/US2017/016903; dated May 9, 2017; 14 pgs.

* cited by examiner

MULTIPLE-SPEED MESSAGE CHANNEL OF MESSAGING SYSTEM

CROSS-REFERENCE TO RELATED APPLICATIONS

This application is a continuation of U.S. application Ser. No. 15/202,908, filed Jul. 6, 2016, which is hereby incorporated by reference in its entirety.

BACKGROUND

This specification relates to a data communication system and, in particular, a system that implements multiple-speed message channels.

The publish-subscribe pattern (or "PubSub") is a data communication messaging arrangement implemented by software systems where so-called publishers publish messages to topics and so-called subscribers receive the messages pertaining to particular topics to which they are subscribed. There can be one or more publishers per topic and publishers generally have no knowledge of what subscribers, if any, will receive the published messages. Some Pub Sub systems do not cache messages or have small caches meaning that subscribers may not receive messages that were published before the time of subscription to a particular topic. Pub Sub systems can be susceptible to performance instability during surges of message publications or as the number of subscribers to a particular topic increases.

SUMMARY

In general, one aspect of the subject matter described in this specification can be embodied in methods that include the actions of receiving from a plurality of publishers messages of a first channel of a plurality of distinct channels wherein each channel comprises an ordered plurality of messages, storing messages of the first channel in one or more first buffers according to the order, each first buffer having a respective time-to-live, for one or more connections, determining a respective sampling rate based on a data type of the first channel and a determined latency of the connection, receiving from a subscriber through a first connection a request for messages of the first channel, selecting messages in the first buffers according to the order and the sampling rate, and sending the selected messages using the first connection to the subscriber according to the order. Other embodiments of this aspect include corresponding systems, apparatus, and computer programs.

These and other aspects can optionally include one or more of the following features. The aspect can further comprise determining a latency of the first connection using a round-trip delay time of the connection. The aspect can further comprise determining a latency of the first connection based on an indication of delay or missing delivery to the subscriber of one or more messages of the first channel. The aspect can further comprise receiving the indication from the subscriber. Determining a latency of the first connection can be further based on a second indication of delay or missing delivery to the subscriber of one or more messages of a second channel of the plurality of distinct channels. The aspect can further comprise determining a second latency of the first connection based on delay or missing delivery to the subscriber of one or more of the selected messages, and adjusting the respective sampling rate for the first connection based on the second latency. Adjusting sampling rate for the first connection further comprise changing the respective sampling rate inversely to a change from the previously determined latency for the selected messages to the second latency. Determining a respective sampling rate based on a data type further comprise identifying a time-varying data field of messages of the first channel, obtaining respective data values in the time-varying data field from two or more messages of the first channel, and determining a magnitude of changes with respect to time in the respective data values and, based thereon, determining a respective sampling rate for a particular connection.

Particular embodiments of the subject matter described in this specification can be implemented to realize one or more of the following advantages. When a network connection is not stable either due to accumulation of messages at an intermediate router or mobile base station, or because of connectivity problems, the latency of the connection degrades. This can cause problems for applications that expect to receive messages transmitted over the connection in a timely fashion (i.e., with an acceptable latency). When the latency of the connection is poor, particular embodiments herein describe techniques for pacing data transmissions, sampling data transmissions, or both, to accommodate the latency of the connection. This results in better performance of applications that are dependent on receiving messages regularly because the applications will not be overwhelmed with messages that arrive in clumps or messages that arrive too late for real-time applications.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1A:
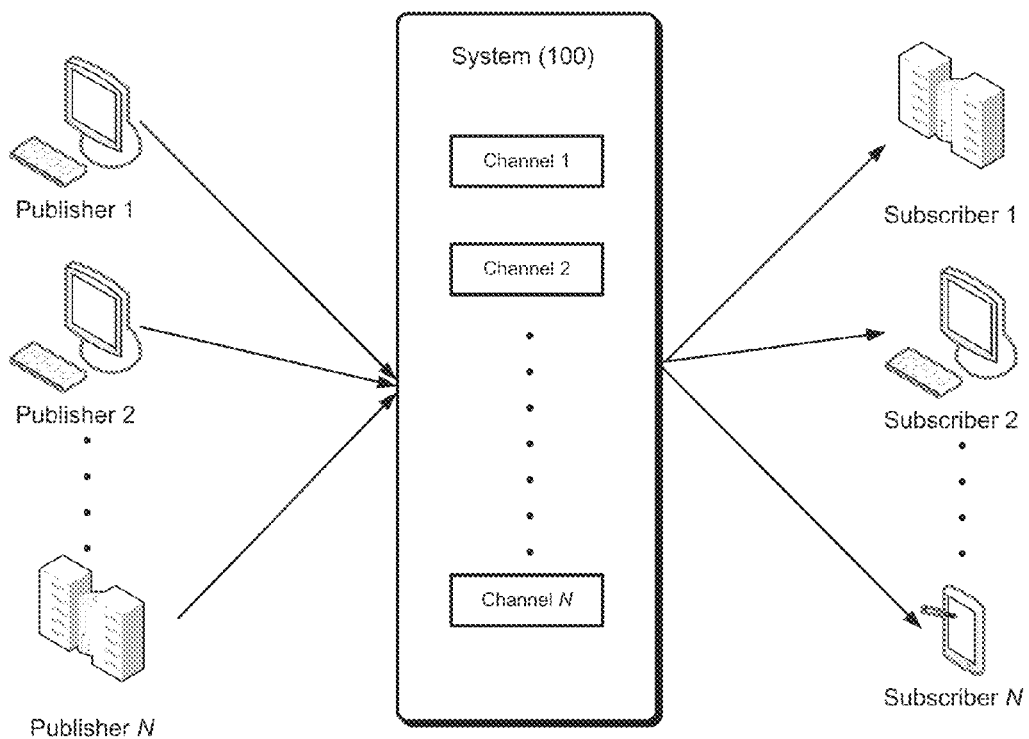
FIG. 1A illustrates an example system that supports the Pub Sub communication pattern.

FIG. 1A illustrates an example system 100 that supports the Pub Sub communication pattern. Publisher clients (e.g., Publisher 1) can publish messages to named channels (e.g., "Channel 1") by way of the system 100. A message can comprise any type of information including one or more of the following: text, image content, sound content, multimedia content, video content, binary data, and so on. Other types of message data are possible. Subscriber clients (e.g., Subscriber 2) can subscribe to a named channel using the system 100 and start receiving messages which occur after the subscription request or from a given position (e.g., a message number or time offset). A client can be both a publisher and a subscriber.

Depending on the configuration, a Pub Sub system can be categorized as follows:

One to One (1:1). In this configuration there is one publisher and one subscriber per channel. A typical use case is private messaging.

One to Many (1:N). In this configuration there is one publisher and multiple subscribers per channel. Typical use cases are broadcasting messages (e.g., stock prices).

Many to Many (M:N). In this configuration there are many publishers publishing to a single channel. The messages are then delivered to multiple subscribers. Typical use cases are map applications.

There is no separate operation needed to create a named channel. A channel is created implicitly when the channel is subscribed to or when a message is published to the channel. In some implementations, channel names can be qualified by a name space. A name space comprises one or more channel names. Different name spaces can have the same channel names without causing ambiguity. The name space name can be a prefix of a channel name where the name space and channel name are separated by a dot. In some implementations, name spaces can be used when specifying channel authorization settings. For instance, the messaging system 100 may have app1.foo and app1.system.notifications channels where "app1" is the name of the name space. The system can allow clients to subscribe and publish to the app1.foo channel. However, clients can only subscribe to, but not publish to the app1.system.notifications channel.

Figure 1B:
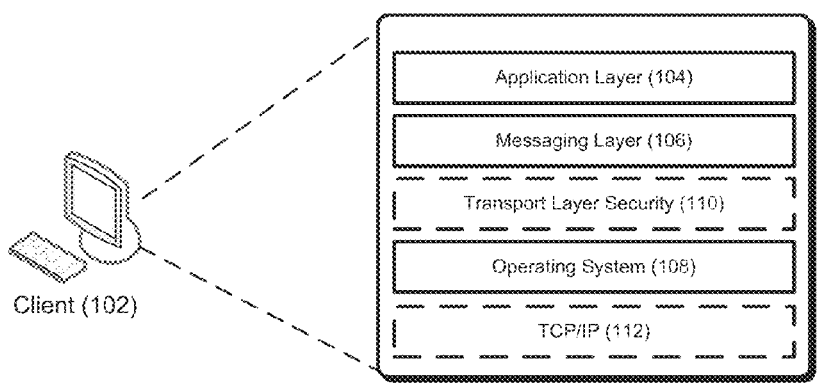
FIG. 1B illustrates functional layers of software on an example client device.

FIG. 1B illustrates functional layers of software on an example client device. A client device (e.g., client 102) is a data processing apparatus such as, for example, a personal computer, a laptop computer, a tablet computer, a smart phone, a smart watch, or a server computer. Other types of client devices are possible. The application layer 104 comprises the end-user application(s) that will integrate with the Pub Sub system 100. The messaging layer 106 is a programmatic interface for the application layer 104 to utilize services of the system 100 such as channel subscription, message publication, message retrieval, user authentication, and user authorization. In some implementations, the messages passed to and from the messaging layer 106 are encoded as JavaScript Object Notation (JSON) objects. Other message encoding schemes are possible.

The operating system 108 layer comprises the operating system software on the client 102. In various implementations, messages can be sent and received to/from the system 100 using persistent or non-persistent connections. Persistent connections can be created using, for example, network sockets. A transport protocol such as TCP/IP layer 112 implements the Transport Control Protocol/Internet Protocol communication with the system 100 that can be used by the messaging layer 106 to send messages over connections to the system 100. Other communication protocols are possible including, for example, User Datagram Protocol (UDP). In further implementations, an optional Transport Layer Security (TLS) layer 110 can be employed to ensure the confidentiality of the messages.

Figure 2:
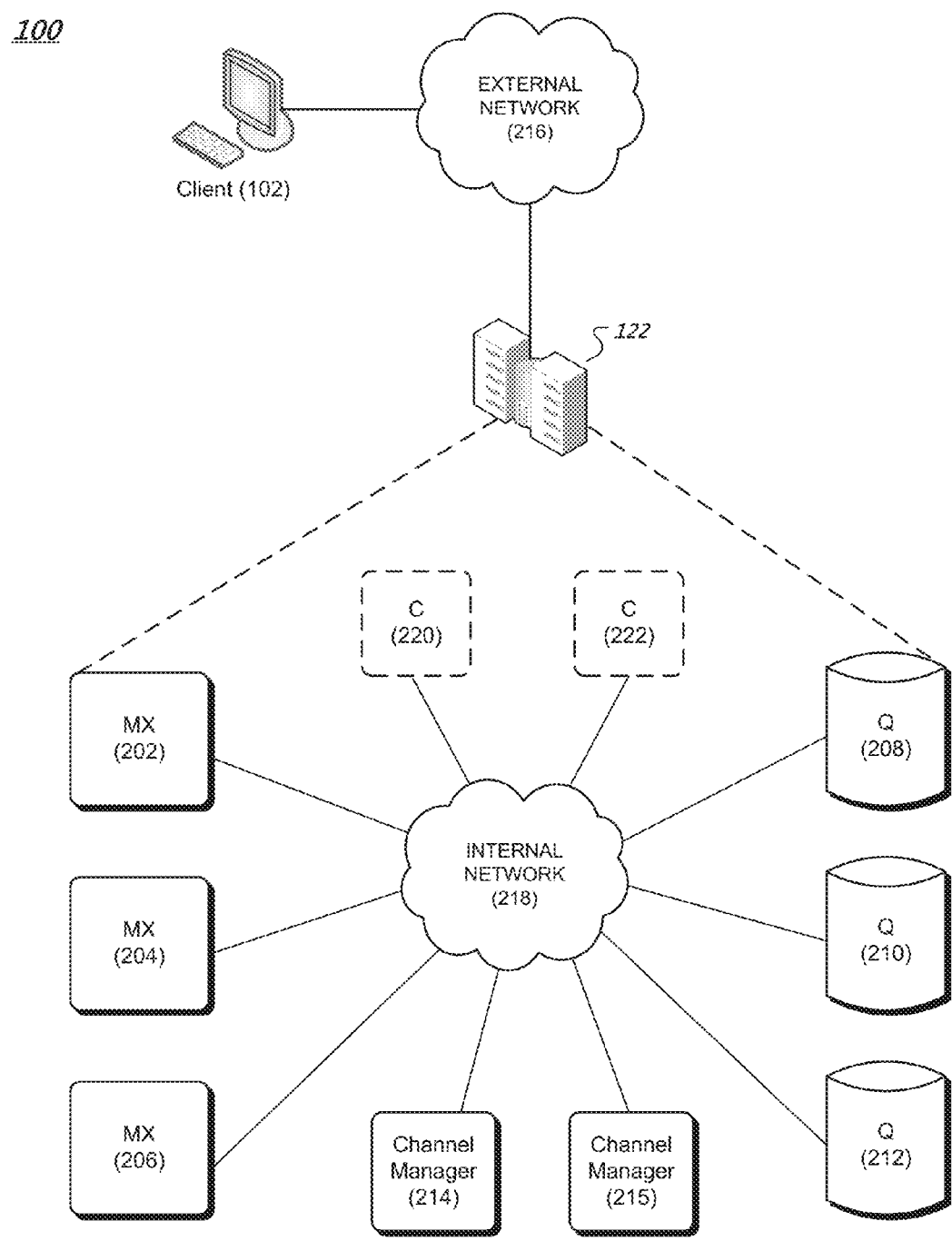
FIG. 2 is a diagram of an example messaging system.

FIG. 2 is a diagram of an example messaging system 100. The system 100 provides functionality for implementing PubSub communication patterns. The system comprises software components and storage that can be deployed at one or more data centers 122 in one or more geographic locations, for example. The system comprises MX nodes (e.g., MX nodes or multiplexer nodes 202, 204 and 206), Q nodes (e.g., Q nodes or queue nodes 208, 210 and 212), one or more channel manager nodes (e.g., channel managers 214, 215), and optionally one or more C nodes (e.g., C nodes or cache nodes 220 and 222). Each node can execute in a virtual machine or on a physical machine (e.g., a data processing apparatus). Each MX node serves as a termination point for one or more publisher and/or subscriber connections through the external network 216. The internal communication among MX nodes, Q nodes, C nodes, and the channel manager, is conducted over an internal network 218, for example. By way of illustration, MX node 204 can be the terminus of a subscriber connection from client 102. Each Q node buffers channel data for consumption by the MX nodes. An ordered sequence of messages published to a channel is a logical channel stream. For example, if three clients publish messages to a given channel, the combined messages published by the clients comprise a channel stream. Messages can be ordered in a channel stream by time of publication by the client, by time of receipt by an MX node, or by time of receipt by a Q node. Other ways for ordering messages in a channel stream are possible. In the case where more than one message would be assigned to the same position in the order, one of the messages can be chosen (e.g., randomly) to have a later sequence in the order. Each channel manager node is responsible for managing Q node load by splitting channel streams into so-called streamlets. Streamlets are discussed further below. The optional C nodes provide caching and load removal from the Q nodes.

In the example messaging system 100, one or more client devices (publishers and/or subscribers) establish respective persistent connections (e.g., TCP connections) to an MX node (e.g., MX node 204). The MX node serves as a termination point for these connections. For instance, external messages (e.g., between respective client devices and the MX node) carried by these connections can be encoded based on an external protocol (e.g., JSON). The MX node terminates the external protocol and translates the external messages to internal communication, and vice versa. The MX nodes publish and subscribe to streamlets on behalf of clients. In this way, an MX node can multiplex and merge requests of client devices subscribing for or publishing to the same channel, thus representing multiple client devices as one, instead of one by one.

In the example messaging system 100, a Q node (e.g., Q node 208) can store one or more streamlets of one or more channel streams. A streamlet is a data buffer for a portion of a channel stream. A streamlet will close to writing when its storage is full. A streamlet will close to reading and writing and be de-allocated when its time-to-live (TTL) has expired. By way of illustration, a streamlet can have a maximum size of 1 MB and a TTL of three minutes. Different channels can have streamlets limited by different TTLs. For instance, streamlets in one channel can exist for up to three minutes, while streamlets in another channel can exist for up to 10 minutes. In various implementations, a streamlet corresponds to a computing process running on a Q node. The computing process can be terminated after the streamlet's TTL has expired, thus freeing up computing resources (for the streamlet) back to the Q node, for example.

When receiving a publish request from a client device, an MX node (e.g., MX node 204) makes a request to a channel manager (e.g., channel manager 214) to grant access to a streamlet to write the message being published. Note, however, that if the MX node has already been granted write access to a streamlet for the channel (and the channel has not been closed to writing), the MX node can write the message to that streamlet without having to request a grant to access the streamlet. Once a message is written to a streamlet for a channel, the message can be read by MX nodes and provided to subscribers of that channel.

Similarly, when receiving a channel subscription request from a client device, an MX node makes a request to a channel manager to grant access to a streamlet for the channel from which messages are read. If the MX node has already been granted read access to a streamlet for the channel (and the channel's TTL has not been closed to reading), the MX node can read messages from the streamlet without having to request a grant to access the streamlet. The read messages can then be forwarded to client devices that have subscribed to the channel. In various implementations, messages read from streamlets are cached by MX nodes so that MX nodes can reduce the number of times needed to read from the streamlets.

By way of illustration, an MX node can request a grant from the channel manager that allows the MX node to store a block of data into a streamlet on a particular Q node that stores streamlets of the particular channel. Example streamlet grant request and grant data structures are as follows:

```
StreamletGrantRequest={
"channel": string( )
"mode": "read" | "write"
"position": 0
}
StreamletGrantResponse={
"streamlet-id": "abcdef82734987",
"limit-size": 2000000, #2 megabytes max
"limit-msgs": 5000, #5 thousand messages max
"limit-life": 4000, # the grant is valid for 4 seconds
"q-node": string( )
"position": 0
}
```

The StreamletGrantRequest data structure stores the name of the stream channel and a mode indicating whether the MX node intends on reading from or writing to the streamlet. The MX node sends the StreamletGrantRequest to a channel manager node. The channel manager node, in response, sends the MX node a StreamletGrantResponse data structure. The StreamletGrantResponse contains an identifier of the streamlet (streamlet-id), the maximum size of the streamlet (limit-size), the maximum number of messages that the streamlet can store (limit-msgs), the TTL (limit-life), and an identifier of a Q node (q-node) on which the streamlet resides. The StreamletGrantRequest and StreamletGrantResponse can also have a position field that points to a position in a streamlet (or a position in a channel) for reading from the streamlet.

A grant becomes invalid once the streamlet has closed. For example, a streamlet is closed to reading and writing once the streamlet's TTL has expired and a streamlet is closed to writing when the streamlet's storage is full. When a grant becomes invalid, the MX node can request a new grant from the channel manager to read from or write to a streamlet. The new grant will reference a different streamlet and will refer to the same or a different Q node depending on where the new streamlet resides.

Figure 3A:
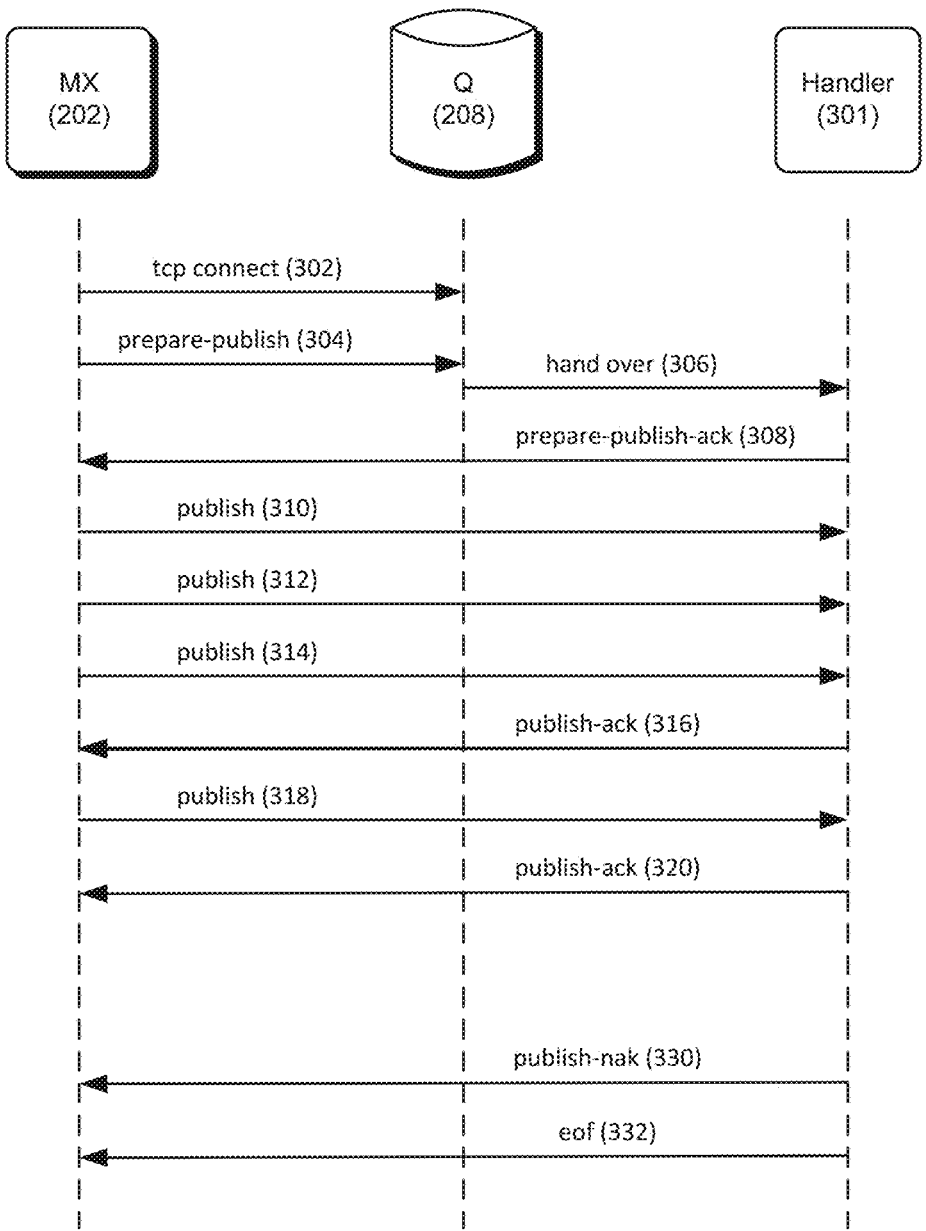
FIG. 3A is a data flow diagram of an example method for writing data to a streamlet.

FIG. 3A is a data flow diagram of an example method for writing data to a streamlet in various embodiments. In FIG. 3A, when an MX node (e.g., MX node 202) request to write to a streamlet is granted by a channel manager (e.g., channel manager 214), as described before, the MX node establishes a Transmission Control Protocol (TCP) connection with the Q node (e.g., Q node 208) identified in the grant response received from the channel manager (302). A streamlet can be written concurrently by multiple write grants (e.g., for messages published by multiple publisher clients). Other types of connection protocols between the MX node and the Q node are possible.

The MX node then sends a prepare-publish message with an identifier of a streamlet that the MX node wants to write to the Q node (304). The streamlet identifier and Q node identifier can be provided by the channel manager in the write grant as described earlier. The Q node hands over the message to a handler process 301 (e.g., a computing process running on the Q node) for the identified streamlet (306). The handler process can send to the MX node an acknowledgement (308). After receiving the acknowledgement, the MX node starts writing (publishing) messages (e.g., 310, 312, 314, and 318) to the handler process, which in turns stores the received data in the identified streamlet. The handler process can also send acknowledgements (316, 320) to the MX node for the received data. In some implementations, acknowledgements can be piggy-backed or cumulative. For instance, the handler process can send to the MX node an acknowledgement for every predetermined amount of data received (e.g., for every 100 messages received), or for every predetermined time period (e.g., for every one millisecond). Other acknowledgement scheduling algorithms, such as Nagle's algorithm, can be used.

If the streamlet can no longer accept published data (e.g., when the streamlet is full), the handler process sends a Negative-Acknowledgement (NAK) message (330) indicating a problem, following by an EOF (end-of-file) message (332). In this way, the handler process closes the association with the MX node for the publish grant. The MX node can then request a write grant for another streamlet from a channel manager if the MX node has additional messages to store.

Figure 3B:
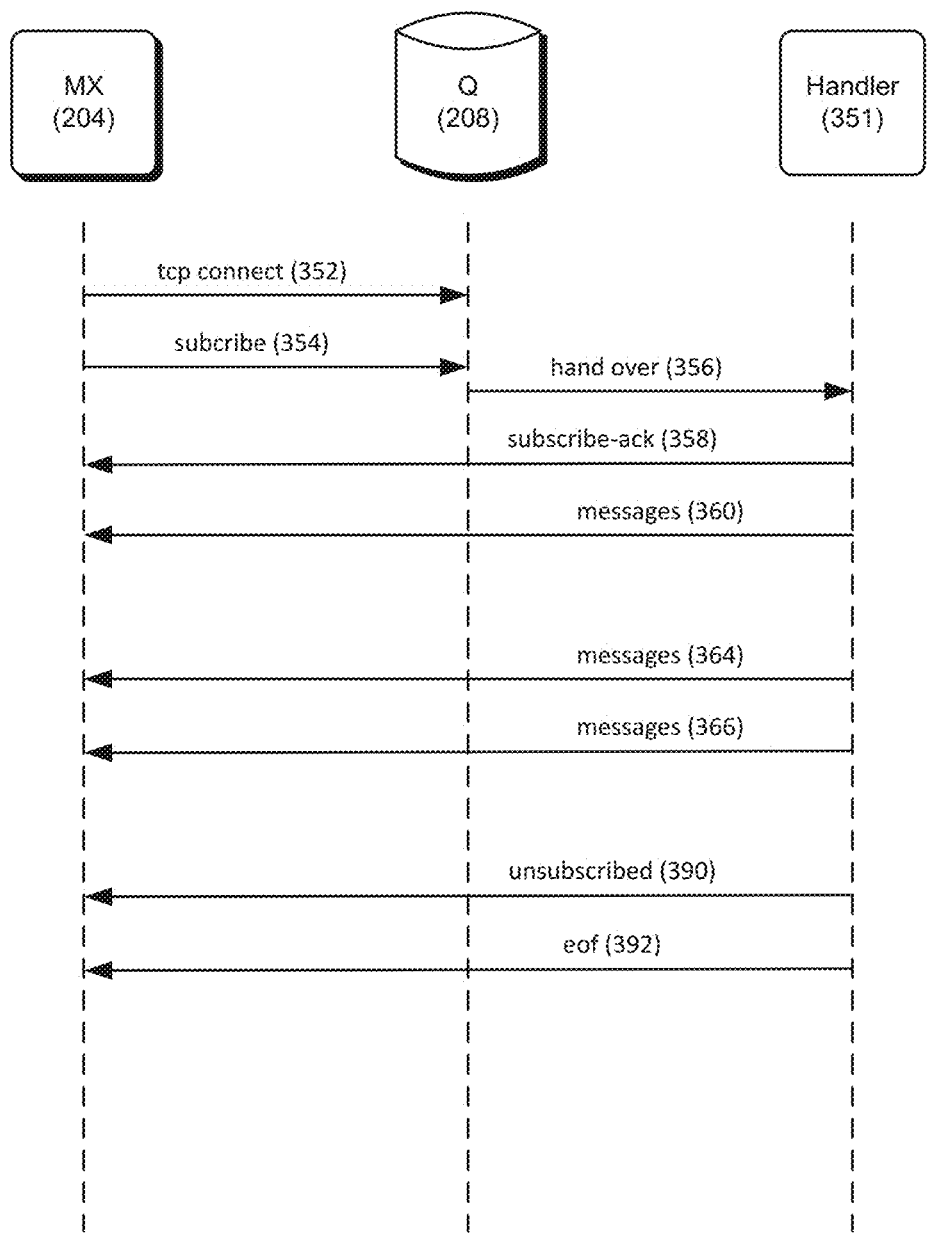
FIG. 3B is a data flow diagram of an example method for reading data from a streamlet.

FIG. 3B is a data flow diagram of an example method for reading data from a streamlet in various embodiments. In FIG. 3B, an MX node (e.g., MX node 204) sends to a channel manager (e.g., channel manager 214) a request for reading a particular channel starting from a particular message or time offset in the channel. The channel manager returns to the MX node a read grant including an identifier of a streamlet containing the particular message, a position in the streamlet corresponding to the particular message, and an identifier of a Q node (e.g., Q node 208) containing the particular streamlet. The MX node then establishes a TCP connection with the Q node (352). Other types of connection protocols between the MX node and the Q node are possible.

The MX node then sends to the Q node a subscribe message (354) with the identifier of the streamlet (in the Q node) and the position in the streamlet from which the MX node wants to read (356). The Q node hands over the subscribe message to a handler process 351 for the streamlet (356). The handler process can send to the MX node an acknowledgement (358). The handler process then sends messages (360, 364, 366), starting at the position in the streamlet, to the MX node. In some implementations, the handler process can send all of the messages in the streamlet to the MX node. After sending the last message in a particular streamlet, the handler process can send a notification of the last message to the MX node. The MX node can send to the channel manager another request for another streamlet containing a next message in the particular channel.

If the particular streamlet is closed (e.g., after its TTL has expired), the handler process can send an unsubscribe message (390), followed by an EOF message (392), to close the association with the MX node for the read grant. The MX node can close the association with the handler process when the MX node moves to another streamlet for messages in the particular channel (e.g., as instructed by the channel manager). The MX node can also close the association with the handler process if the MX node receives an unsubscribe message from a corresponding client device.

In various implementations, a streamlet can be written into and read from at the same time instance. For instance, there can be a valid read grant and a valid write grant at the same time instance. In various implementations, a streamlet can be read concurrently by multiple read grants (e.g., for channels subscribed to by multiple publisher clients). The handler process of the streamlet can order messages from concurrent write grants based on, for example, time-of-arrival, and store the messages based on the order. In this way, messages published to a channel from multiple publisher clients can be serialized and stored in a streamlet of the channel.

In the messaging system 100, one or more C nodes (e.g., C node 220) can offload data transfers from one or more Q nodes. For instance, if there are many MX nodes requesting streamlets from Q nodes for a particular channel, the streamlets can be offloaded and cached in one or more C nodes. The MX nodes (e.g., as instructed by read grants from a channel manager) can read the streamlets from the C nodes instead.

As described above, messages for a channel in the messaging system 100 are ordered in a channel stream. A channel manager (e.g., channel manager 214) splits the channel stream into fixed-sized streamlets that each reside on a respective Q node. In this way, storing a channel stream can be shared among many Q nodes; each Q node stores a portion (one or more streamlets) of the channel stream. More particularly, a streamlet can be stored in registers and dynamic memory elements associated with a computing process on a Q node, thus avoiding the need to access persistent, slower storage devices such as hard disks. This results in faster message access. The channel manager can also balance load among Q nodes in the messaging system 100 by monitoring respective workloads of the Q nodes and allocating streamlets in a way that avoids overloading any one Q node.

In various implementations, a channel manager maintains a list identifying each active streamlet, the respective Q node on which the streamlet resides, an identification of the position of the first message in the streamlet, and whether the streamlet is closed for writing. In some implementations, Q nodes notify the channel manager and any MX nodes that are publishing to a streamlet that the streamlet is closed due to being full or when the streamlet's TTL has expired. When a streamlet is closed, the streamlet remains on the channel manager's list of active streamlets until the streamlet's TTL has expired so that MX nodes can continue to retrieve messages from the streamlet.

When an MX node requests a write grant for a given channel and there is not a streamlet for the channel that can be written to, the channel manager allocates a new streamlet on one of the Q nodes and returns the identity of the streamlet and the Q node in the StreamletGrantResponse. Otherwise, the channel manager returns the identity of the currently open for writing streamlet and corresponding Q node in the StreamletGrantResponse. MX nodes can publish messages to the streamlet until the streamlet is full or the streamlet's TTL has expired, after which a new streamlet can be allocated by the channel manager.

When an MX node requests a read grant for a given channel and there is not a streamlet for the channel that can be read from, the channel manager allocates a new streamlet on one of the Q nodes and returns the identity of the streamlet and the Q node in the StreamletGrantResponse. Otherwise, the channel manager returns the identity of the streamlet and Q node that contains the position from which the MX node wishes to read. The Q node can then begin sending messages to the MX node from the streamlet beginning at the specified position until there are no more messages in the streamlet to send. When a new message is published to a streamlet, MX nodes that have subscribed to that streamlet will receive the new message. If a streamlet's TTL has expired, the handler process 351 sends an EOF message (392) to any MX nodes that are subscribed to the streamlet.

As described earlier in reference to FIG. 2, the messaging system 100 can include multiple channel managers (e.g., channel managers 214, 215). Multiple channel managers provide resiliency and prevent single point of failure. For instance, one channel manager can replicate lists of streamlets and current grants it maintains to another "slave" channel manager. As for another example, multiple channel managers can coordinate operations between them using distributed consensus protocols, such as Paxos or Raft protocols.

Figure 4A:
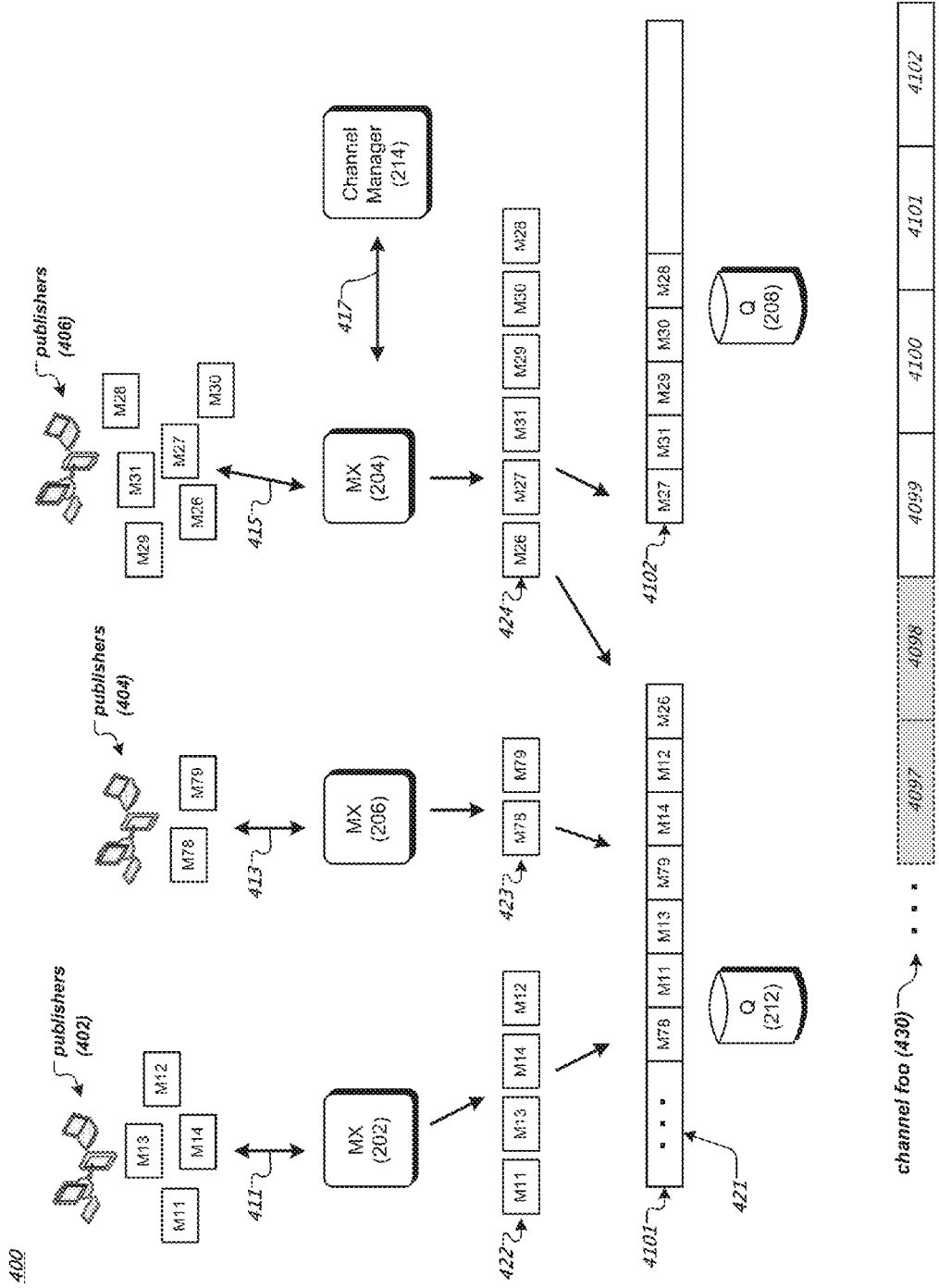
FIG. 4A is a data flow diagram of an example method for publishing messages to a channel of a messaging system.

FIG. 4A is a data flow diagram of an example method for publishing messages to a channel of a messaging system. In FIG. 4A, publishers (e.g., publisher clients 402, 404, 406) publish messages to the messaging system 100 described earlier in reference to FIG. 2. For instance, publishers 402 respectively establish connections 411 and send publish requests to the MX node 202. Publishers 404 respectively establish connections 413 and send publish requests to the MX node 206. Publishers 406 respectively establish connections 415 and send publish requests to the MX node 204. Here, the MX nodes can communicate (417) with a channel manager (e.g., channel manager 214) and one or more Q nodes (e.g., Q nodes 212 and 208) in the messaging system 100 via the internal network 218.

By way of illustration, each publish request (e.g., in JSON key/value pairs) from a publisher to an MX node includes a channel name and a message. The MX node (e.g., MX node 202) can assign the message in the publish request to a distinct channel in the messaging system 100 based on the channel name (e.g., "foo") of the publish request. The MX node can confirm the assigned channel with the channel manager 214. If the channel (specified in the subscribe request) does not yet exist in the messaging system 100, the channel manager can create and maintain a new channel in the messaging system 100. For instance, the channel manager can maintain a new channel by maintaining a list identifying each active streamlet of the channel's stream, the respective Q node on which the streamlet resides, and identification of the positions of the first and last messages in the streamlet as described earlier.

For messages of a particular channel, the MX node can store the messages in one or more buffers or streamlets in the messaging system 100. For instance, the MX node 202 receives from the publishers 402 requests to publish messages M11, M12, M13, and M14 to a channel foo. The MX node 206 receives from the publishers 404 requests to publish messages M78 and M79 to the channel foo. The MX node 204 receives from the publishers 406 requests to publish messages M26, M27, M28, M29, M30, and M31 to the channel foo.

The MX nodes can identify one or more streamlets for storing messages for the channel foo. As described earlier, each MX node can request a write grant from the channel manager 214 that allows the MX node to store the messages in a streamlet of the channel foo. For instance, the MX node 202 receives a grant from the channel manager 214 to write messages M11, M12, M13, and M14 to a streamlet 4101 on the Q node 212. The MX node 206 receives a grant from the channel manager 214 to write messages M78 and M79 to the streamlet 4101. Here, the streamlet 4101 is the last one (at the moment) of a sequence of streamlets of the channel stream 430 storing messages of the channel foo. The streamlet 4101 has messages (421) of the channel foo that were previously stored in the streamlet 4101, but is still open, i.e., the streamlet 4101 still has space for storing more messages and the streamlet's TTL has not expired.

The MX node 202 can arrange the messages for the channel foo based on the respective time that each message was received by the MX node 202, e.g., M11, M13, M14, M12 (422), and store the received messages as arranged in the streamlet 4101. That is, the MX node 202 receives M11 first, followed by M13, M14, and M12. Similarly, the MX node 206 can arrange the messages for the channel foo based on their respective time that each message was received by the MX node 206, e.g., M78, M79 (423), and store the received messages as arranged in the streamlet 4101.

The MX node 202 (or MX node 206) can store the received messages using the method for writing data to a streamlet described earlier in reference to FIG. 3A, for example. In various implementations, the MX node 202 (or MX node 206) can buffer (e.g., in a local data buffer) the received messages for the channel foo and store the received messages in a streamlet for the channel foo (e.g., streamlet 4101) when the buffered messages reach a predetermined size (e.g., 100 messages), or when a predetermined time (e.g., 50 milliseconds) has elapsed. That is, the MX node 202 can store in the streamlet 100 messages at a time or in every 50 milliseconds. Other acknowledgement scheduling algorithms, such as Nagle's algorithm, can be used.

In various implementations, the Q node 212 (e.g., a handler process) stores the messages of the channel foo in the streamlet 4101 in the order as arranged by the MX node 202 and MX node 206. The Q node 212 stores the messages of the channel foo in the streamlet 4101 in the order the Q node 212 receives the messages. For instance, assume that the Q node 212 receives messages M78 (from the MX node 206) first, followed by messages M11 and M13 (from the MX node 202), M79 (from the MX node 206), and M14 and M12 (from the MX node 202). The Q node 212 stores in the streamlet 4101 the messages in the order as received, e.g., M78, M11, M13, M79, M14, and M12, immediately after the messages 421 that are already stored in the streamlet 4101. In this way, messages published to the channel foo from multiple publishers (e.g., 402, 404) can be serialized in a particular order and stored in the streamlet 4101 of the channel foo. Different subscribers that subscribe to the channel foo will receive messages of the channel foo in the same particular order, as will be described in more detail in reference to FIG. 4B.

In the example of FIG. 4A, at a time instance after the message M12 was stored in the streamlet 4101, the MX node 204 requests a grant from the channel manager 214 to write to the channel foo. The channel manager 214 provides the MX node 204 a grant to write messages to the streamlet 4101, as the streamlet 4101 is still open for writing. The MX node 204 arranges the messages for the channel foo based on the respective time that each message was received by the MX node 204, e.g., M26, M27, M31, M29, M30, M28 (424), and stores the messages as arranged for the channel foo.

By way of illustration, assume that the message M26 is stored to the last available position of the streamlet 4101. As the streamlet 4101 is now full, the Q node 212 sends to the MX node 204 a NAK message, following by an EOF message, to close the association with the MX node 204 for the write grant, as described earlier in reference to FIG. 3A. The MX node 204 then requests another write grant from the channel manager 214 for additional messages (e.g., M27, M31, and so on) for the channel foo.

The channel manager 214 can monitor available Q nodes in the messaging system 100 for their respective workloads (e.g., how many streamlets are residing in each Q node). The channel manager 214 can allocate a streamlet for the write request from the MX node 204 such that overloading (e.g., too many streamlets or too many read or write grants) can be avoided for any given Q node. For instance, the channel manager 214 can identify a least loaded Q node in the messaging system 100 and allocate a new streamlet on the least loaded Q node for write requests from the MX node 204. In the example of FIG. 4A, the channel manager 214 allocates a new streamlet 4102 on the Q node 208 and provides a write grant to the MX node 204 to write messages for the channel foo to the streamlet 4102. As shown in FIG. 4A, the Q node stores in the streamlet 4102 the messages from the MX node 204 in an order as arranged by the MX node 204: M27, M31, M29, M30, and M28 (assuming that there is no other concurrent write grant for the streamlet 4102 at the moment).

When the channel manager 214 allocates a new streamlet (e.g., streamlet 4102) for a request for a grant from an MX node (e.g., MX node 204) to write to a channel (e.g., foo), the channel manager 214 assigns to the streamlet its TTL, which will expire after TTLs of other streamlets that are already in the channel's stream. For instance, the channel manager 214 can assign to each streamlet of the channel foo's channel stream a TTL of 3 minutes when allocating the streamlet. That is, each streamlet will expire 3 minutes after it is allocated (created) by the channel manager 214. Since a new streamlet is allocated after a previous streamlet is closed (e.g., filled entirely or expired), in this way, the channel foo's channel stream comprises streamlets that each expires sequentially after its previous streamlet expires. For instance, as shown in an example channel stream 430 of the channel foo in FIG. 4A, streamlet 4098 and streamlets before 4098 have expired (as indicated by the dotted-lined gray-out boxes). Messages stored in these expired streamlets are not available for reading for subscribers of the channel foo. Streamlets 4099, 4100, 4101, and 4102 are still active (not expired). The streamlets 4099, 4100, and 4101 are closed for writing, but still are available for reading. The streamlet 4102 is available for reading and writing, at the moment when the message M28 was stored in the streamlet 4102. At a later time, the streamlet 4099 will expire, following by the streamlets 4100, 4101, and so on.

Figure 4B:
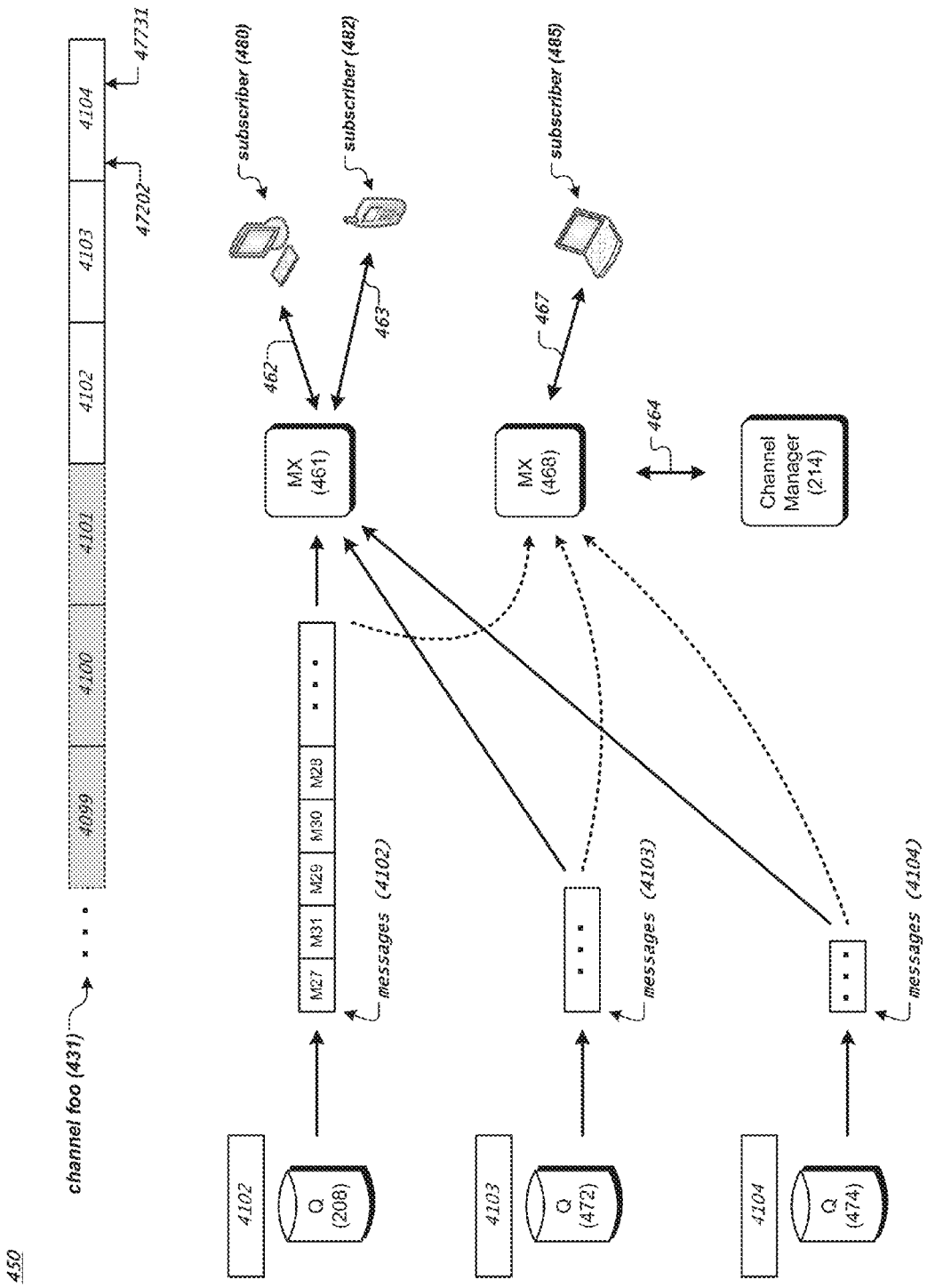
FIG. 4B is a data flow diagram of an example method for subscribing to a channel of a messaging system.

FIG. 4B is a data flow diagram of an example method for subscribing to a channel of a messaging system. In FIG. 4B, a subscriber 480 establishes a connection 462 with an MX node 461 of the messaging system 100. Subscriber 482 establishes a connection 463 with the MX node 461. Subscriber 485 establishes a connection 467 with an MX node 468 of the messaging system 100. Here, the MX nodes 461 and 468 can respectively communicate (464) with the channel manager 214 and one or more Q nodes in the messaging system 100 via the internal network 218.

A subscriber (e.g., subscriber 480) can subscribe to the channel foo of the messaging system 100 by establishing a connection (e.g., 462) and sending a request for subscribing to messages of the channel foo to an MX node (e.g., MX node 461). The request (e.g., in JSON key/value pairs) can include a channel name "foo." When receiving the subscribe request, the MX node 461 can send to the channel manager 214 a request for a read grant for a streamlet in the channel foo's channel stream.

By way of illustration, assume that at the current moment the channel foo's channel stream 431 includes active streamlets 4102, 4103, and 4104, as shown in FIG. 4B. The streamlets 4102 and 4103 each are full. The streamlet 4104 stores messages of the channel foo, including the last message (at the current moment) stored at a position 47731. Streamlets 4101 and streamlets before 4101 are invalid, as their respective TTLs have expired. Note that the messages M78, M11, M13, M79, M14, M12, and M26 stored in the streamlet 4101, described earlier in reference to FIG. 4A, are no longer available for subscribers of the channel foo, since the streamlet 4101 is no longer valid, as its TTL has expired. As described earlier, each streamlet in the channel foo's channel stream has a TTL of 3 minutes, thus only messages (as stored in streamlets of the channel foo) that are published to the channel foo (i.e., stored into the channel's streamlets) no earlier than 3 minutes from the current time can be available for subscribers of the channel foo.

The MX node 461 can request a read grant for all available messages in the channel foo, for example, when the subscriber 480 is a new subscriber to the channel foo. Based on the request, the channel manager 214 provides the MX node 461 a read grant to the streamlet 4102 (on the Q node 208) that is the earliest streamlet in the active streamlets of the channel foo (i.e., the first in the sequence of the active streamlets). The MX node 461 can retrieve messages in the streamlet 4102 from the Q node 208, using the method for reading data from a streamlet described earlier in reference to FIG. 3B, for example. Note that the messages retrieved from the streamlet 4102 maintain the same order as stored in the streamlet 4102. In various implementations, when providing messages stored in the streamlet 4102 to the MX node 461, the Q node 208 can buffer (e.g., in a local data buffer) the messages and send the messages to the MX node 461 when the buffer messages reach a predetermined size (e.g., 200 messages) or a predetermined time (e.g., 50 milliseconds) has elapsed. That is, the Q node 208 can send the channel foo's messages (from the streamlet 4102) to the MX node 461 200 messages at a time or in every 50 milliseconds. Other acknowledgement scheduling algorithms, such as Nagle's algorithm, can be used.

After receiving the last message in the streamlet 4102, the MX node 461 can send an acknowledgement to the Q node 208, and send to the channel manager 214 another request (e.g., for a read grant) for the next streamlet in the channel stream of the channel foo. Based on the request, the channel manager 214 provides the MX node 461 a read grant to the streamlet 4103 (on Q node 472) that logically follows the streamlet 4102 in the sequence of active streamlets of the channel foo. The MX node 461 can retrieve messages stored in the streamlet 4103, e.g., using the method for reading data from a streamlet described earlier in reference to FIG. 3B, until it retrieves the last message stored in the streamlet 4103. The MX node 461 can send to the channel manager 214 yet another request for a read grant for messages in the next streamlet 4104 (on Q node 474). After receiving the read grant, the MX node 461 retrieves message of the channel foo stored in the streamlet 4104, until the last message at the position 47731. Similarly, the MX node 468 can retrieve messages from the streamlets 4102, 4103, and 4104 (as shown with dotted arrows in FIG. 4B), and provide the messages to the subscriber 485.

The MX node 461 can send the retrieved messages of the channel foo to the subscriber 480 (via the connection 462) while receiving the messages from the Q node 208, 472, or 474. In various implementations, the MX node 461 can store the retrieved messages in a local buffer. In this way, the retrieved messages can be provided to another subscriber (e.g., subscriber 482) when the other subscriber subscribes to the channel foo and requests the channel's messages. The MX node 461 can remove messages stored in the local buffer that each has a time of publication that has exceeded a predetermined time period. For instance, the MX node 461 can remove messages (stored in the local buffer) with respective times of publication exceeding 3 minutes. In some implementations, the predetermined time period for keeping messages in the local buffer on MX node 461 can be the same as or similar to the time-to-live duration of a streamlet in the channel foo's channel stream, since at a given moment, messages retrieved from the channel's stream do not include those in streamlets having respective time-to-lives that had already expired.

The messages retrieved from the channel stream 431 and sent to the subscriber 480 (by the MX node 461) are arranged in the same order as the messages were stored in the channel stream. For instance, messages published to the channel foo are serialized and stored in the streamlet 4102 in a particular order (e.g., M27, M31, M29, M30, and so on), then stored subsequently in the streamlet 4103 and the streamlet 4104. The MX node retrieves messages from the channel stream 431 and provides the retrieved messages to the subscriber 480 in the same order as the messages are stored in the channel stream: M27, M31, M29, M30, and so on, followed by ordered messages in the streamlet 4103, and followed by ordered messages in the streamlet 4104.

Instead of retrieving all available messages in the channel stream 431, the MX node 461 can request a read grant for messages stored in the channel stream 431 starting from a message at particular position, e.g., position 47202. For instance, the position 47202 can correspond to an earlier time instance (e.g., 10 seconds before the current time) when the subscriber 480 was last subscribing to the channel foo (e.g., via a connection to the MX node 461 or another MX node of the messaging system 100). The MX node 461 can send to the channel manager 214 a request for a read grant for messages starting at the position 47202. Based on the request, the channel manager 214 provides the MX node 461 a read grant to the streamlet 4104 (on the Q node 474) and a position on the streamlet 4104 that corresponds to the channel stream position 47202. The MX node 461 can retrieve messages in the streamlet 4104 starting from the provided position, and send the retrieved messages to the subscriber 480.

As described above in reference to FIGS. 4A and 4B, messages published to the channel foo are serialized and stored in the channel's streamlets in a particular order. The channel manager 214 maintains the ordered sequence of streamlets as they are created throughout their respective time-to-lives. Messages retrieved from the streamlets by an MX node (e.g., MX node 461, or MX node 468) and provided to a subscriber can be, in some implementations, in the same order as the messages are stored in the ordered sequence of streamlets. In this way, messages sent to different subscribers (e.g., subscriber 480, subscriber 482, or subscriber 485) can be in the same order (as the messages are stored in the streamlets), regardless which MX nodes the subscribers are connected to.

In various implementations, a streamlet stores messages in a set of blocks of messages. Each block stores a number of messages. For instance, a block can store two hundred kilobytes of messages. Each block has its own time-to-live, which can be shorter than the time-to-live of the streamlet holding the block. Once a block's TTL has expired, the block can be discarded from the streamlet holding the block, as described in more detail below in reference to FIG. 4C.

Figure 4C:
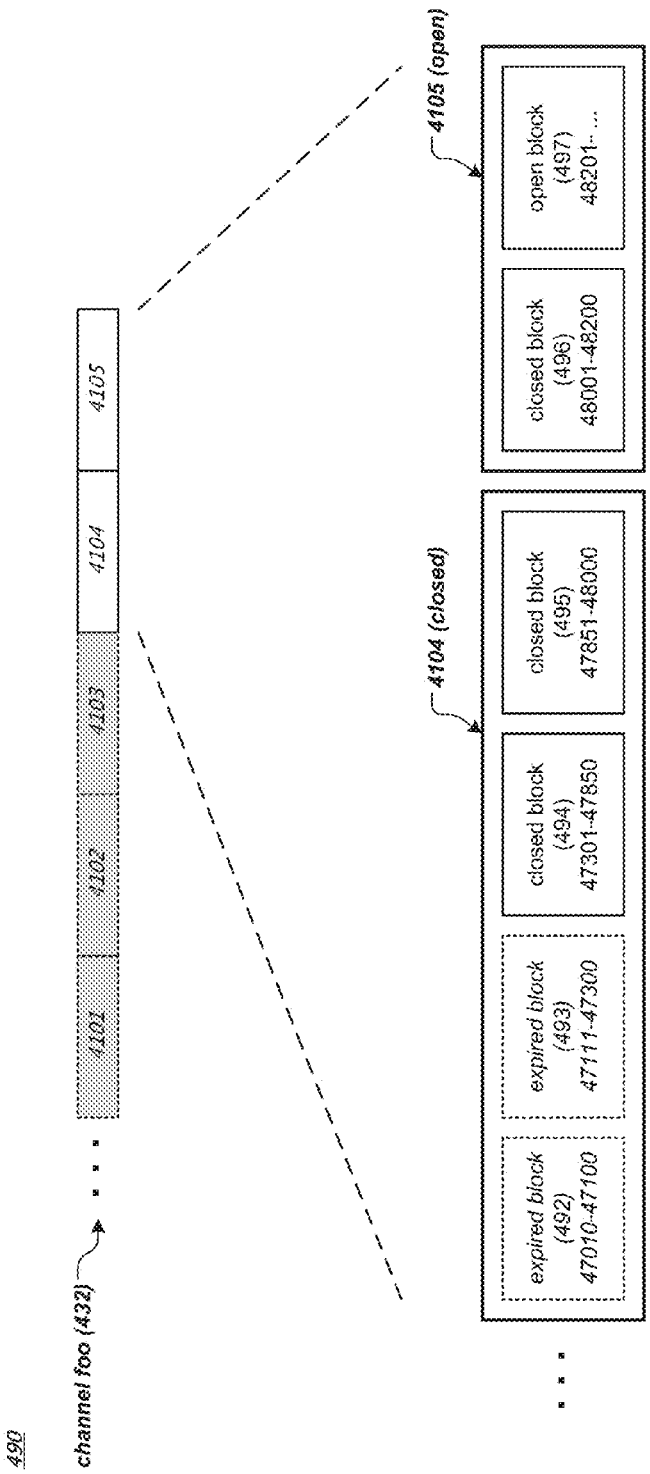
FIG. 4C is an example data structure for storing messages of a channel of a messaging system.

FIG. 4C is an example data structure for storing messages of a channel of a messaging system. As described with the channel foo in reference to FIGS. 4A and 4B, assume that at the current moment the channel foo's channel stream 432 includes active streamlets 4104 and 4105, as shown in FIG. 4C. Streamlet 4103 and streamlets before 4103 are invalid, as their respective TTLs have expired. The streamlet 4104 is already full for its capacity (e.g., as determined by a corresponding write grant) and is closed for additional message writes. The streamlet 4104 is still available for message reads. The streamlet 4105 is open and is available for message writes and reads.

By way of illustration, the streamlet 4104 (e.g., a computing process running on the Q node 474 shown in FIG. 4B) currently holds two blocks of messages. Block 494 holds messages from channel positions 47301 to 47850. Block 495 holds messages from channel positions 47851 to 48000. The streamlet 4105 (e.g., a computing process running on another Q node in the messaging system 100) currently holds two blocks of messages. Block 496 holds messages from channel positions 48001 to 48200. Block 497 holds messages starting from channel position 48201, and still accepts additional messages of the channel foo.

When the streamlet 4104 was created (e.g., by a write grant), a first block (sub-buffer) 492 was created to store messages, e.g., from channel positions 47010 to 47100. Later on, after the block 492 had reached its capacity, another block 493 was created to store messages, e.g., from channel positions 47111 to 47300. Blocks 494 and 495 were subsequently created to store additional messages. Afterwards, the streamlet 4104 was closed for additional message writes, and the streamlet 4105 was created with additional blocks for storing additional messages of the channel foo.

In this example, the respective TTL's of blocks 492 and 493 had expired. The messages stored in these two blocks (from channel positions 47010 to 47300) are no longer available for reading by subscribers of the channel foo. The streamlet 4104 can discard these two expired blocks, e.g., by de-allocating the memory space for the blocks 492 and 493. The blocks 494 or 495 could become expired and be discarded by the streamlet 4104, before the streamlet 4104 itself becomes invalid. Alternatively, streamlet 4104 itself could become invalid before the blocks 494 or 495 become expired. In this way, a streamlet can hold one or more blocks of messages, or contain no block of messages, depending on respective TTLs of the streamlet and blocks, for example.

A streamlet, or a computing process running on a Q node in the messaging system 100, can create a block for storing messages of a channel by allocating a certain size of memory space from the Q node. The streamlet can receive, from an MX node in the messaging system 100, one message at a time and store the received message in the block. Alternatively, the MX node can assemble (i.e., buffer) a group of messages and send the group of messages to the Q node. The streamlet can allocate a block of memory space (from the Q node) and store the group of messages in the block. The MX node can also perform compression on the group of messages, e.g., by removing a common header from each message.

Figure 5:
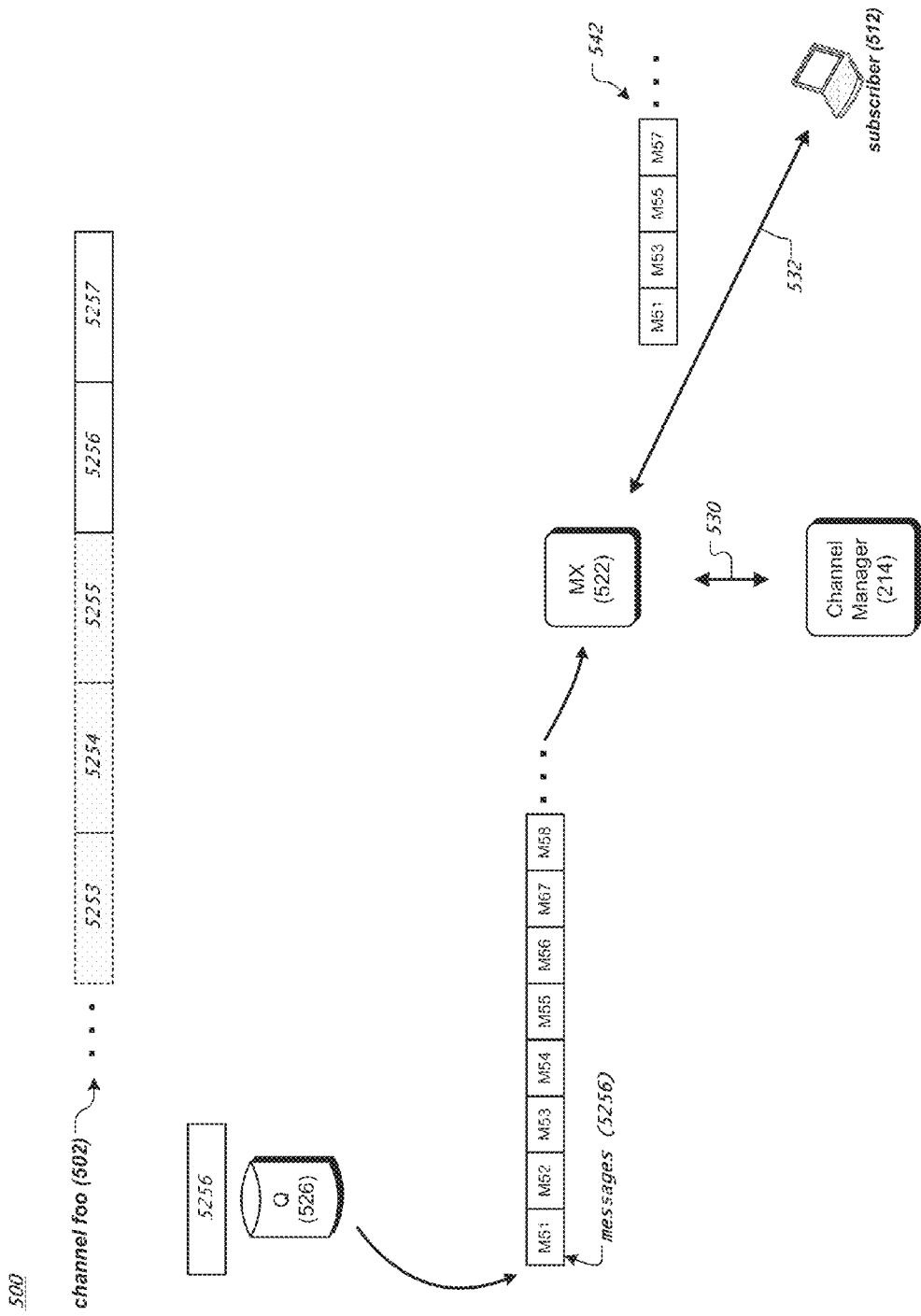
FIG. 5 is a data flow diagram of an example method for providing messages to a subscriber of a messaging system when there are issues with the subscriber network connection.

FIG. 5 is a data flow diagram of an example method for providing messages to a subscriber of the messaging system 100 when there are issues with the subscriber network connection. In FIG. 5, a subscriber 512 establishes a connection 532 with an MX node 522 in the messaging system 100. Messages sent over the connection 532 can be sent using the TCP/IP protocol, for example, or another suitable protocol that has error recovery. Alternatively, the protocol can be UDP or another protocol that does not provide reliable delivery of packets.

The connection 532 may traverse one or more wired and/or wireless networks. The MX node 522 can communicate (530) with the channel manager 214 and one or more Q nodes in the messaging system 100 via the internal network 218. In this example, the subscriber 512 subscribes to the channel named foo of the messaging system 100 by sending a subscribe request to the MX node 522. When receiving the subscribe request, the MX node 522 sends to the channel manager 214 a request for a read grant for a streamlet in the channel foo's channel stream.

By way of illustration, assume that at the current moment the channel foo's channel stream 502 includes active streamlets 5256 and 5257, as shown in FIG. 5. Streamlets 5255 and streamlets before 5255 are invalid, as their respective TTLs have expired. The channel manager 214 provides the MX node 522 a read grant to the streamlet 5256 (e.g., residing on a Q node 526 in the messaging system 100). The MX node 522 can retrieve messages in the streamlet 5256 (e.g., M51, M52, M53, M54, and so on) from the Q node 526, using the method for reading data from a streamlet described earlier in reference to FIG. 3B, for example, and provide the retrieved messages to the subscriber 512 using the connection 532.

One issue that can occur with the connection 532 is the accumulation of messages at intermediate routers or mobile base stations due to instability over one or more network links along the connection 532. This can result in the accumulated messages arriving together at the subscriber 512, potentially resulting in erratic application behavior on the client device. For example, if the messages contained stock price information for a stock ticker application, such behavior could result in a period of stock sudden ticker activity followed by a period of no activity. A second issue that can occur is when there is a temporary delay along the connection 532 which can result a decrease in messages received by the subscriber 512. For real-time applications, the slow-down could cause the application running on the subscriber 512 device to become out of date.

The health of the connection 532 between the MX node 522 and the subscriber 512 can be determined based on the latency of the connection 532. In order to calculate the latency, a round-trip time (RTT) is first determined for the connection 532. The RTT is a measure of elapsed time beginning with the sending of a message from the MX node 522 to the subscriber 512 and ending when the MX node 522 receives an acknowledgement that the message was received from the subscriber 512. The RTT can be determined for all subscriber connections. The RTT can be calculated in several ways. One way is to use a utility program such as "ping" which will probe the connection 532 and determine the RTT. The RTT can also be obtained from information maintained by the TCP protocol. For example, TCP has an internal RTT estimation facility that can be accessed through an extension of a network driver. In a similar fashion, the TCP/IP packet sequence numbers in acknowledgements can be used to determine the RTT. Finally, another way of calculating RTT is to use application-level messaging between the subscriber 512 and the MX node 522. For example, a message containing the time the message is sent can be sent from the MX node 522 to the subscriber 512. When an application running on the subscriber 512 receives the message, it can respond with an acknowledgement message to the MX node 522 that contains the time from the initial message. Upon receipt of the acknowledgement message, the MX node 522 can subtract the time of the message contained in the acknowledgement from the current time to determine the RTT. This last way of determining the RTT has the advantage that it takes into account any delays that the application may experience rather than delays entirely at the network protocol (e.g., TCP/IP) level.

Once the RTT for the connection 532 is determined the latency of the connection 532 is calculated. The latency provides an indication of the health of the connection 532. In some implementations, the latency is RTT/2. In further implementations, the latency is the average RTT divided by 2. The average RTT is the average value of RTT calculations determined for a time period such as 5 minutes, for example. In some implementations, the length of the time period can be based on the number of messages per second being sent on a given connection. For example, the time period can be equal to c[1/(messages per second)] where c is a constant value between 2 and 100. Other ways of calculating the time period are possible.

There are several ways to mitigate the latency of the connection 532. One approach is pacing which requires that the MX node 522 slow down the rate of transmission of messages to the subscriber 512 on the connection 532. For example, the rate of transmission of messages from the MX node 522 to the subscriber 512 can be regulated so that the rate does not exceed the latency. Another approach, which is covered in more detail below, is sampling. Sampling reduces the number of messages sent to the subscriber 512 by sending only a subset of messages to the subscriber 512. One or both of the techniques can be used.

Instead of sending all the retrieved messages from streamlets of the channel foo to the subscriber 512 through the connection 532, the MX node 522 can sample the retrieved messages based on the latency of the connection 532 and send the sampled messages to the subscriber 512 through the connection 532. For instance, if the latency of the connection 532 is 200 milliseconds, the MX node 522 can send every other retrieved message to the subscriber 512 using the connection 532. As shown in FIG. 5, the MX node 522 can send retrieved messages M51, M53, M55, and so on (542) to the subscriber 512. As for another example, if the latency of the connection 532 is 400 milliseconds, the MX node 522 can send one out of four received messages to the subscriber 512 using the connection 532. The MX node 522 can send one and skip three retrieved messages (e.g., M51, M55, M59, and so on) to the subscriber 512 using the connection 532. In this way, the subscriber 512 can receive sampled messages of the channel foo at the same speed that the sampled messages were published to the channel foo, by skipping some of the messages of the channel that would not otherwise arrive at the subscriber 512 on time. Note here the MX node 522 sends the sampled messages in the same order as the messages are stored in the streamlet 5256, i.e., in the same order as the messages are stored in the channel foo's stream.

In various implementations, the MX node 522 can dynamically adjust the sampling rate on the retrieved messages based on a current latency of the connection 532. For instance, the MX node 522 may determine a latency of 200 milliseconds for the connection 532 and send every other retrieved messages (i.e., sampling rate of 50%) to the subscriber 512 using the connection 532 based on the determined latency of 200 milliseconds. At a later time, the MX node 522 may determine a latency of 80 milliseconds for the connection 532, then send every retrieved messages (i.e., sampling rate of 100%) to the subscriber 512 using the connection 532, since the connection 532 is not a bottleneck in delivering the retrieved messages to the subscriber 512. In this example, if the MX node 522 determines, at a later time, that a latency for the connection 532 has increased to 400 milliseconds, the MX node 522 can reduce the sampling rate to 25% and send one of every four retrieved messages to the subscriber 512 using the connection 532. That is, the MX node 522 can dynamically adjust the sampling rate (on the retrieved messages) inversely to a change in the latency for the connection 532.

In some implementations, the sampling rate can also be based on a data type of the channel foo. For instance, messages of the channel foo can be stock quotes as described above. Since stock quotes may not vary significantly over a particular time period (e.g., one second), the sampling rate can be the same as or similar to the particular time period, e.g., sampling one for every ten messages (stock quotes) of the channel foo. The sampled messages can still represent the overall messages of the channel foo. Other data types are possible. For instance, messages of the channel foo can be temperature readings of a particular room for every one minute. Since the temperature readings may not vary significantly over a 20-minute period, the sampling rate can be one out of twenty messages, while the sampled temperature readings still can represent the overall temperature of the room. For example, the MX node 532 can inspect messages of the channel foo and identify a data field in the messages containing time-varying data values such as temperature readings or stock quotes. The MX node 532 obtains values in the time-varying data field from several messages of the channel foo, determines a magnitude of changes in these values with respect to time, and determines a sampling rate for the connection 532 accordingly. In the example of the temperature readings above, for instance, if the MX node 532 determines that variations in temperature readings is less than five percent over a period of 30 minutes, the MX node 532 can determine a sampling rate of one out of every thirty messages (readings). In some implementations, some messages of the channel foo can be marked with a data type or a priority value indicating that these messages cannot be skipped for delivering to the subscriber 512 (e.g., system or control messages). In this case, a sampling rate for these messages can be 100%.

In some implementations, the MX node 522 can also determine a latency of the connection 532 based on an indication of delay or missing delivery to the subscriber 512 of one or more messages of the channel foo. For instance, an application running on the subscriber 512 can examine each message of the channel foo it receives for a time stamp of a publish time (to the channel) or a message serial number. If the application detects that a delivery delay (e.g., from a message's time stamp to its arrival time at the subscriber 512) is increasing, e.g., when a latency of the connection 532 is greater than the rate messages are published to the channel foo, the application can send an indication to the MX node 522 about the delay. If the application detects one or more missing messages of the channel foo (e.g., based on discontinuous serial numbers of the received messages), the application can also send an indication for missing deliveries to the MX node 522.

Based on the indication of missing or delayed delivery, the MX node 522 can apply a sampling rate (e.g., less than 100 percent) to the messages to be provided to the subscriber 512, so that the subscriber 512 can keep up with the speed messages that are published to channel foo. The MX node 522 can also adjust (e.g., decrease) an existing sampling rate for the connection 532 based on the indication. For instance, the MX node 522 can determine a sampling rate of 50% (e.g., less than 1/1.8) for providing messages of the channel foo to the subscriber 512 using the connection 532.

In some implementations, the MX node 522 can determine a latency of the connection 532 based on an indication of delay or missing delivery to the subscriber 512 of one or more messages of another channel in the messaging system 100. For instance, the application running on the subscriber 512 can send an indication that one out of every two messages of another channel named bar did not arrive at the subscriber 512. In this case, the MX node 522 can determine a sampling rate of 50% for providing messages of the channel foo to the subscriber 512 using the connection 532.

Figure 6:
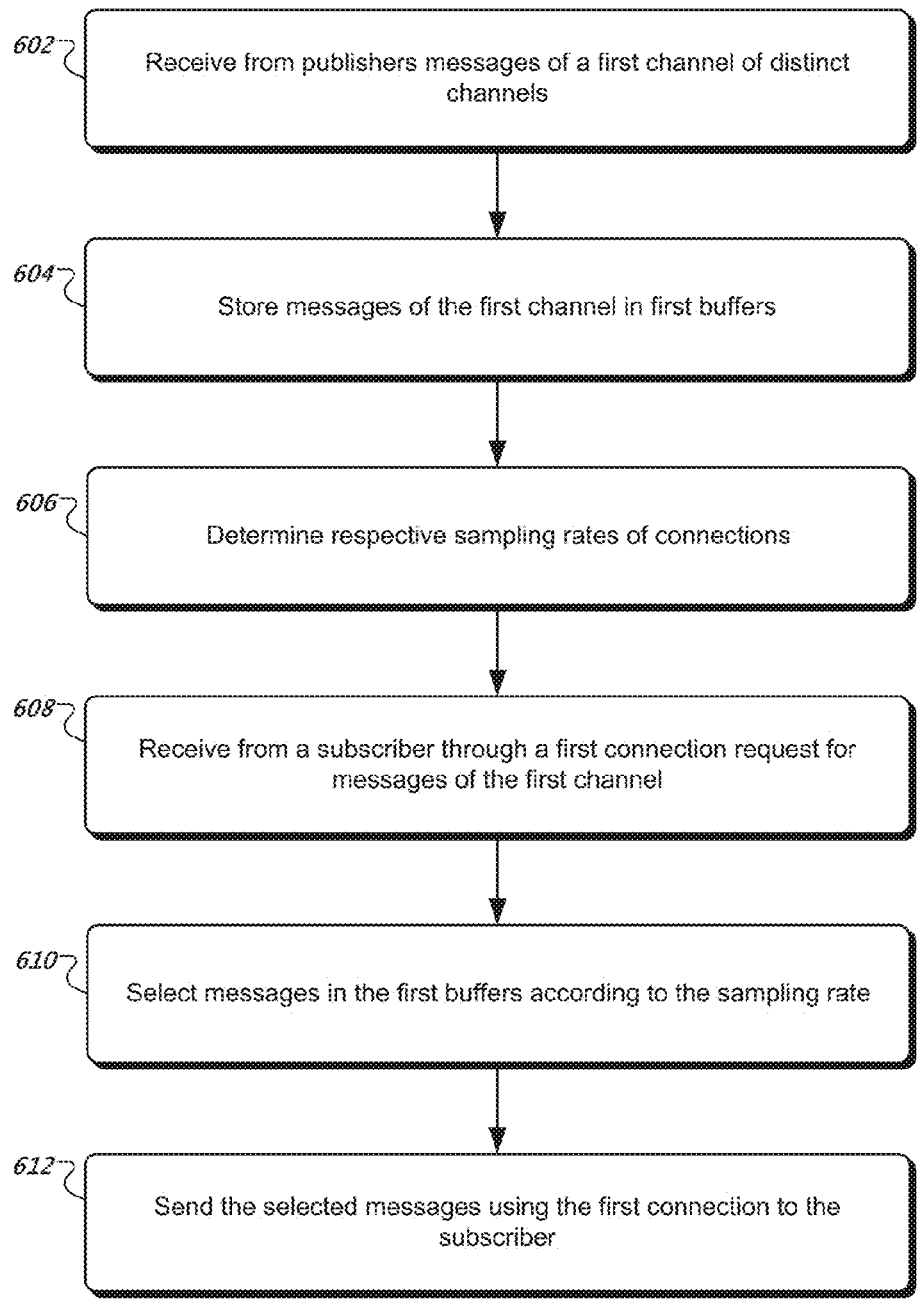
FIG. 6 is a flowchart of an example method for providing messages to a subscriber of a messaging system.

FIG. 6 is a flowchart of an example method for providing messages to a subscriber of the messaging system 100. The method can be implemented using an MX node (e.g., MX node 204, MX node 522) in the messaging system 100, for example. The method begins by receiving from a plurality of publishers messages of a first channel of a plurality of distinct channels wherein each channel comprises an ordered plurality of messages (602). The method stores messages of the first channel in one or more first buffers according to the order, each first buffer having a respective time-to-live (604). For one or more connections, the method determines a respective sampling rate based on a data type of the first channel and a determined latency of the connection (606). The method receives from a subscriber through a first connection a request for messages of the first channel (608). The method selects messages in the first buffers according to the order and the sampling rate (610). The method sends the selected messages using the first connection to the subscriber according to the order (612).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    storing messages of a channel of a plurality of channels in one or more buffers according to an order, wherein each buffer comprises a respective time-to-live;
    for one or more connections, determining, by one or more computer processors, a respective sampling rate based on one of a data type of the channel and a determined latency of each connection;
    receiving a request for messages of the channel from a subscriber through a connection of the one or more connections;
    selecting messages from the one or more buffers according to the sampling rate; and
    sending the selected messages to the subscriber according to the order using the connection.

2. The method of claim 1, comprising:
    receiving messages of the channel from a plurality of publishers.

3. The method of claim 2, wherein the order comprises the order in which messages of the channel were received.

4. The method of claim 1, wherein determining the respective sampling rate based on the data type of the channel comprises:
    identifying a time-varying data field in messages of the channel;
    obtaining respective data values in the time-varying data field from two or more messages of the channel; and determining a magnitude of changes in the respective data values with respect to time to determine the respective sampling rate for each connection.

5. The method of claim 1, wherein determining the respective sampling rate based on the data type of the channel comprises:
identifying one or more messages of the channel having a prioritized message data type, wherein sampling does not skip messages having the prioritized message data type for delivery to the subscriber.

6. The method of claim 1, comprising:
determining the latency of the connection based on an indication of at least one of a delay and a missing delivery to the subscriber of one or more messages of the channel.

7. The method of claim 6, wherein the indication is received from the subscriber.

8. The method of claim 1, comprising:
determining the latency of the connection based on an indication of at least one of a delay and a missing delivery to the subscriber of one or more messages of another channel of the plurality of channels.

9. The method of claim 1, comprising:
determining a second latency of the connection; and
adjusting the sampling rate for the connection based on the second latency.

10. The method of claim 1, wherein messages are selected from the one or more buffers that have not expired.

11. A system, comprising:
one or more computer processors programmed to:
store messages of a channel of a plurality of channels in one or more buffers according to an order, wherein each buffer comprises a respective time-to-live;
for one or more connections, determine a respective sampling rate based on one of a data type of the channel and a determined latency of each connection;
receive a request for messages of the channel from a subscriber through a connection of the one or more connections;
select messages from the one or more buffers according to the sampling rate; and
send the selected messages to the subscriber according to the order using the connection.

12. The system of claim 11, wherein the one or more computer processors further programmed to receive messages of the channel from a plurality of publishers.

13. The system of claim 12, wherein the order comprises the order in which messages of the channel were received.

14. The system of claim 11, wherein to determine the respective sampling rate based on the data type of the channel, the one or more computer processors are programmed to:
identify a time-varying data field in messages of the channel;
obtain respective data values in the time-varying data field from two or more messages of the channel; and
determine a magnitude of changes in the respective data values with respect to time to determine the respective sampling rate for each connection.

15. The system of claim 11, wherein to determine the respective sampling rate based on the data type of the channel, the one or more computer processors are programmed to:
identify one or more messages of the channel having a prioritized message data type, wherein sampling does not skip messages having the prioritized message data type for delivery to the subscriber.

16. The system of claim 11, wherein the one or more computer processors further programmed to:
determine the latency of the connection based on an indication of at least one of a delay and a missing delivery to the subscriber of one or more messages of the channel.

17. The system of claim 11, wherein the one or more computer processors further programmed to:
determine the latency of the connection based on an indication of at least one of a delay and a missing delivery to the subscriber of one or more messages of another channel of the plurality of channels.

18. The system of claim 11, wherein one or more computer processors further programmed to:
determine a second latency of the connection; and
adjust the sampling rate for the connection based on the second latency.

19. The system of claim 11, wherein messages are selected from the one or more buffers that have not expired.

20. A non-transitory computer-readable medium having instructions stored thereon that, when executed by one or more computer processors, cause the one or more computer processors to:
store messages of a channel of a plurality of channels in one or more buffers according to an order, wherein each buffer comprises a respective time-to-live;
for one or more connections, determine, by the one or more computer processors, a respective sampling rate based on one of a data type of the channel and a determined latency of each connection;
receive a request for messages of the channel from a subscriber through a connection of the one or more connections;
select messages from the one or more buffers according to the sampling rate; and
send the selected messages to the subscriber according to the order using the connection.

* * * * *